US012665755B2

(12) United States Patent
Loiseau et al.

(10) Patent No.: US 12,665,755 B2
(45) Date of Patent: Jun. 23, 2026

(54) HYBRID HIERARCHICAL ENCRYPTION SYSTEM

(71) Applicant: COMMISSARIAT Á L'ÉNERGIE ATOMIQUE ET AUX ÉNERGIES ALTERNATIVES, Paris (FR)

(72) Inventors: Antoine Loiseau, Grenoble (FR);
Doryan Lesaignoux, Grenoble (FR);
Mikael Carmona, Grenoble (FR)

(73) Assignee: COMMISSARIAT À L'ÉNERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 281 days.

(21) Appl. No.: 18/516,293

(22) Filed: Nov. 21, 2023

(65) Prior Publication Data

US 2024/0178998 A1 May 30, 2024

(30) Foreign Application Priority Data

Nov. 22, 2022 (FR) .................................. FR2212137

(51) Int. Cl.
| | |
|---|---|
| *H04L 9/00* | (2022.01) |
| *H04L 9/08* | (2006.01) |
| *H04L 9/30* | (2006.01) |

(52) U.S. Cl.
CPC .......... *H04L 9/0869* (2013.01); *H04L 9/0891* (2013.01); *H04L 9/3073* (2013.01)

(58) Field of Classification Search
CPC .... H04L 9/0869; H04L 9/0891; H04L 9/3073
See application file for complete search history.

(56) References Cited

U.S. PATENT DOCUMENTS

| | | | | |
|---|---|---|---|---|
| 2019/0044708 A1* | 2/2019 | Dewan | .................. | H04L 9/0897 |
| 2024/0333495 A1* | 10/2024 | Bovensiepen | ........ | H04L 9/0861 |

OTHER PUBLICATIONS

Search Report for French application No. 2212137 dated Jul. 24, 2023.
Zhao, Raymond K. et al, "Quantum-safe HIBE: does it cost a Latte?", IACR, International Association for Cryptologic Research vol. 20220503:130924 May 3, 2022 (May 3, 2022), pp. 1-22.

(Continued)

*Primary Examiner* — Thaddeus J Plecha
(74) *Attorney, Agent, or Firm* — McDonald Hopkins LLC

(57) ABSTRACT

A hybrid cryptographic scheme for a network of nodes, in particular an IoT network, composed of a first subset and a second subset of separate nodes, the computing resources of the nodes of the first subset being greater than the computing resources of the nodes of the second subset, the scheme comprising a first functional cryptographic scheme deployed on the first subset of nodes and a second functional cryptographic scheme deployed on the second subset of nodes, a cryptographic primitive at the root of the second cryptographic scheme generating a pair of private and public master keys from a seed, the seed being obtained by a connection cryptographic primitive from at least the private key of an end node of the first subset, the connection cryptographic primitive being a one-way function.

11 Claims, 6 Drawing Sheets

(56) References Cited

OTHER PUBLICATIONS

Kumar, Sam et al, "JEDI: Many-to-Many End-to-End Encryption and Key Delegation for IoT", Arxiv.Org, Cornell University Library, 201 Olin Library Cornell University Ithaca, NY 14853, May 31, 2019, XP081611409.

Wu, David J. et al, "Privacy, Discovery, and Authentication for the Internet of Things", Arxiv.Org, Cornell University Library, 201 Olin Library Cornell University Ithaca, NY 14853, Apr. 23, 2016, XP080697484.

* cited by examiner

HYBRID HIERARCHICAL ENCRYPTION SYSTEM

CROSS-REFERENCE TO RELATED APPLICATION

This application claims the priority of French Patent Application No. 2212137, filed Nov. 22, 2022, which is incorporated herein by reference in its entirety

TECHNICAL FIELD

The present invention relates to the field of asymmetric cryptography (or public key encryption) and, more generally, the field of identity-based encryption (IBE) or even of functional encryption (FE). It finds in particular an application in the field of the Internet of Things or IoT.

PRIOR ART

Public key cryptography or, equivalently, asymmetric cryptography, is well known in the prior art. In an asymmetric cryptography system, each node has a pair of keys consisting of a public key and a private key. A sending node wishing to confidentially transmit a message to the receiver encrypts this message with the public key of the receiver. The receiver can then decipher the message thus encrypted with their corresponding private key.

The pairs of keys of the various nodes of a network are managed by a so-called PKI (Public Key Infrastructure), comprising software and hardware components providing the logistics of the keys in the network. Such an infrastructure performs various tasks, in particular generating pairs of public-private keys for the various nodes and generating public key certificates and authenticating same. A certificate makes it possible to attach a public key to the identity of its holder, the certificate being generated by a certification authority, a trusted third party, or even by the holder themselves (self-certification). The PKI infrastructure is also responsible for the broadcasting, publication, verification and revocation of the public key certificates. Thus the various nodes can have access to all the certificates and know their respective statuses. The PKI infrastructure provides the protection, sequestration and recovery of the private keys. Sequestering the private keys makes it possible to recover a private key that has been lost, for example. Finally, the PKI infrastructure archives the certificates and logs the actions on the keys. It is thus possible to retrace the history of the operations on these keys (generation, revocation, archiving).

The management, revocation and archiving of the public key certificates (in accordance with the standard X.509) makes the PKI infrastructures relatively complex, in particular in the case of IoT networks where numerous nodes are frequently added, removed or updated.

Architectures based on identity or IBE (Identity-Based Encryption) or even on attributes or ABE (Attribute-Based Encryption) make it possible to dispense with such certificates. Thus, for example, in an IBE system involving a sending node and a destination node, the sending node directly uses an identifier particular to the destination node to encrypt and/or sign the message that it wishes to transmit to it, the destination node deciphering it by means of its corresponding private key. In a similar manner, in an ABE system, the sending node uses attributes of the destination node to encrypt and/or sign such a message. Thus, whether in an IBE or ABE system, it is not necessary to know the public key of the destination, knowledge of its identifier (IBE) or of its attributes (ABE) suffices.

More precisely, in the case of an IBE system, an authority called PKG (Public Key Generator) or KGC (Key Generator Centre) is responsible for generating a pair of keys consisting of a public master key (Mpk) and a corresponding private master key (Msk). Whilst the public key PP is common to the whole of the network, the private key Msk is used by the PKG generator to generate the private keys of the various users from their respective identifiers. A destination node receiving a message that has been encrypted (using its identifier) can decipher it by means of its private key obtained from the PKG generator.

IBE architecture is particularly interesting for connected-object networks (IoT) because of its simplicity of deployment. In practice, in particular for large networks, a hierarchical IBE architecture called HIBE (Hierarchical Identity Based Encryption) is used, the principle of which is illustrated in FIG. 1.

In such an architecture, a node of the network fulfils the role of root as PKG generator (or even by receiving the pair of master keys of such a generator). The identity of a node of the network is defined by the concatenation of the identifiers of the nodes through which the path of the tree passes going from the root to the node in question.

The HIBE scheme is entirely defined by four primitives, or in other words by four basic algorithms:

The primitive Setup($1^\lambda$, d) where d is the depth of the tree and $\lambda$ is the security level (expressed in number of bits). This primitive generates the pair of master keys (Msk, Mpk). This primitive is executed by the root.

The primitive Derive or KeyGen is executed by each node of the tree apart from its end nodes (leaves). It enables a node to obtain the private key of each of its child nodes, from its own private key, from the master key, Mpk, and from the identity of each child node. Thus the node C obtains the private key, $sk_{Dn}$, of its child node Dn by calculating $sk_{Dn}$=Derive(Mpk, $Id_A\|Id_c\|Id_{Dn}$, $sk_c$) where $Id_A$, $Id_c$, $Id_{Dn}$ are the respective identifiers of the nodes A, C and Dn where A is the root of the tree. The node C can transmit offline (for example by means of a confidential auxiliary channel), to each of its child nodes, its private key thus obtained.

Thus the private (or secret) keys of the various nodes of the network can be generated, each time from a node to a nearby node, from the root towards the end nodes.

Finally, the primitives Encrypt and Decrypt can be executed by any node of the tree. The primitive Encrypt is used by a sending node to encrypt a message u using the identity of the destination node and of the master public key. The destination node can then decipher the message received by means of its private key and the master public key.

Thus for example, on the figure, the node E2 wishing to transmit the message u to the node D1 deciphers it by means of $\bar{\mu}$=Encrypt(Mpk, $Id_A\|Id_c\|Id_{D1}$; $\mu$) and the node D1 deciphers it by means of Decrypt (Mpk, $sk_{D1}$; $\bar{\mu}$).

There already exist industrial applications in the IoT field using solutions based on an HIBE scheme. They make it possible to generate, from a single master key, millions of private keys for as many connected objects while preserving their anonymity if necessary.

However, the HIBE scheme has an important drawback when the private key of a node must be revoked. Since generating keys is dependent only on the pair of master keys and identifiers of the nodes, revoking the key of a node supposes regenerating the keys of all the nodes of the network. This involves having to maintain the PKD generator online as well as the auxiliary channels for transmitting the secret keys. The IBE or HIBE schemes with possibilities of revocation of keys are designated respectively by the acronyms RIBE (Revocable IBE) and RHIBE (Revocable HIBE). An RIBE scheme can be considered to be a particular case of RHIBE scheme with a depth of tree d=1.

Various RHIBE solutions not requiring having to regenerate all the keys of the nodes of the network in the case of revocation are known from the prior art.

A first solution was proposed in the article by R. Sharma et al. entitled "H-IBE: Hybrid-identity based encryption approach for cloud security with outsourced revocation" published in Proc. of 2016 Int'l Conf. on Signal Processing, Communication, Power, and Embedded System (SCOPES), 3-5 Oct. 2016. This is based on the combination of an IBE encryption scheme and an ABE encryption scheme. The method has recourse to an additional entity, distinct from the PKG generator, responsible for updating the private keys of the nodes according to an attribute characteristic of belonging or not to a list of revoked nodes. This scheme does not however lend itself to a hierarchical architecture as described previously. More recently, the article by S. Wang et al. entitled<<Simplified revocable hierarchy identity-based encryption from lattices>, published in Proc. of 18th Int'l Conf. On Cryptology and Network Security, CANS 2019, Lecture Notes in Computer Science, vol. 11829, pages 99-119, proposes two RHIBE schemes with two distinct security levels (standard model and random oracle model) based on Euclidean networks and the LWE (Learning With Errors) approach of Regev. Though these RHIBE schemes, known by the acronym RHIBE WZH+, have the advantage of being "post-quantum", or in other words being able to withstand attacks using a quantum computer, they are on the other hand inapplicable to an IoT network in which the nodes necessarily have available constrained computing resources. Thus for example, in the RHIBE WZH+ scheme, the size of the encryptions is 1 Mbit for 1 bit in clear.

On the other hand, "post-quantum" IBE schemes that are much less demanding in computing resources are known, such as the DLP scheme proposed in the article by L. Ducas et al. entitled «<Efficient identity-based encryption over NTRU lattices> published in Proc. of Int'l Conference on the Theory and Application of Cryptology and Information Security, ASIACRYPT 2014, Lectures notes on computer science, vol. 8874, pages 22-41. Thus for example, in the DLP scheme, the size of the encryptions is of the order of 31 Kbytes.

One object of the present invention is consequently to propose a post-quantum RHIBE scheme that can be used in an IoT network. More generally, the object of the present invention is to propose an HIBE scheme and even more generally a functional encryption (FE) scheme that can be applied to a network where some of the nodes have only very limited computing resources compared with the other nodes of the network.

DESCRIPTION OF THE INVENTION

The present invention is defined by a hierarchical cryptographic system comprising a network of nodes divided into at least a first subset and a second subset of separate nodes, the computing resources of the nodes of the first subset being greater than the computing resources of the nodes of the second subset, said hierarchical cryptographic system being original in that a first functional cryptographic scheme ($SC_m$) is deployed on the first subset of nodes and a second functional cryptographic scheme ($SC_s$) is deployed on the second subset of nodes, the second functional cryptographic scheme including a first cryptographic primitive (Setup) intended to generate a pair of private and public master keys, $Msk_s$, $Mpk_s$, making it possible next to generate, each time from a node to a nearby node, or gradually, by means of a second cryptographic primitive (Derive), a private key for each of the nodes of the second subset, said first cryptographic primitive generating the pair of private and public master keys from a seed ($seed_z$), said seed being obtained by a so-called connection cryptographic primitive (Derive), from at least the private key of an end node of the first subset, said connection cryptographic primitive being a one-way function.

Preferably, the security level of the connection cryptographic primitive is higher than or equal to the security level of the first cryptographic primitive.

Advantageously, the connection cryptographic primitive comprises as argument the output of a counter, incremented each time the private and public master keys are updated, $Msk_s$, $Mpk_s$.

The one-way function is typically a hash function.

The first cryptographic primitive can use said seed to generate a pseudorandom number.

According to one embodiment, the first cryptographic scheme and/or the second cryptographic scheme is a hierarchical encryption scheme based on the identity of the nodes (HIBE), the identity of a given node being defined as the concatenation of the identifiers of the nodes through which the path passes going from the tree root of said scheme to the given node.

According to a second embodiment, the first cryptographic scheme and/or the second cryptographic scheme is a hierarchical encryption scheme based on the attributes of the nodes (HABE), the attribute of a given node being defined as the concatenation of the attributes of various ranks of the nodes through which the path passes going from the tree root of said scheme to the given node.

In the first embodiment, the first cryptographic scheme can be an identity-based hierarchical encryption scheme with revocation of keys (RHIBE) and the second scheme can be a simple identity-based encryption scheme (IPE).

In all cases, the first cryptographic scheme can be an encryption scheme of the post-quantum type whereas the second cryptographic scheme is not.

Alternatively, the first and second cryptographic schemes can be first and second encryption schemes of the post-quantum type, the first post-quantum encryption scheme being the RHIBE WZH+ scheme and the second post-quantum encryption scheme being the DLP scheme.

In an application context, the network of nodes can be an IoT network, the first subset comprising remote servers and the second subset comprising connected objects.

BRIEF DESCRIPTION OF THE DRAWINGS

Other features and advantages of the invention will appear upon reading a preferential embodiment of the invention, made with reference to the appended figures wherein.

DETAILED DESCRIPTION OF PARTICULAR EMBODIMENTS

Figure 1:
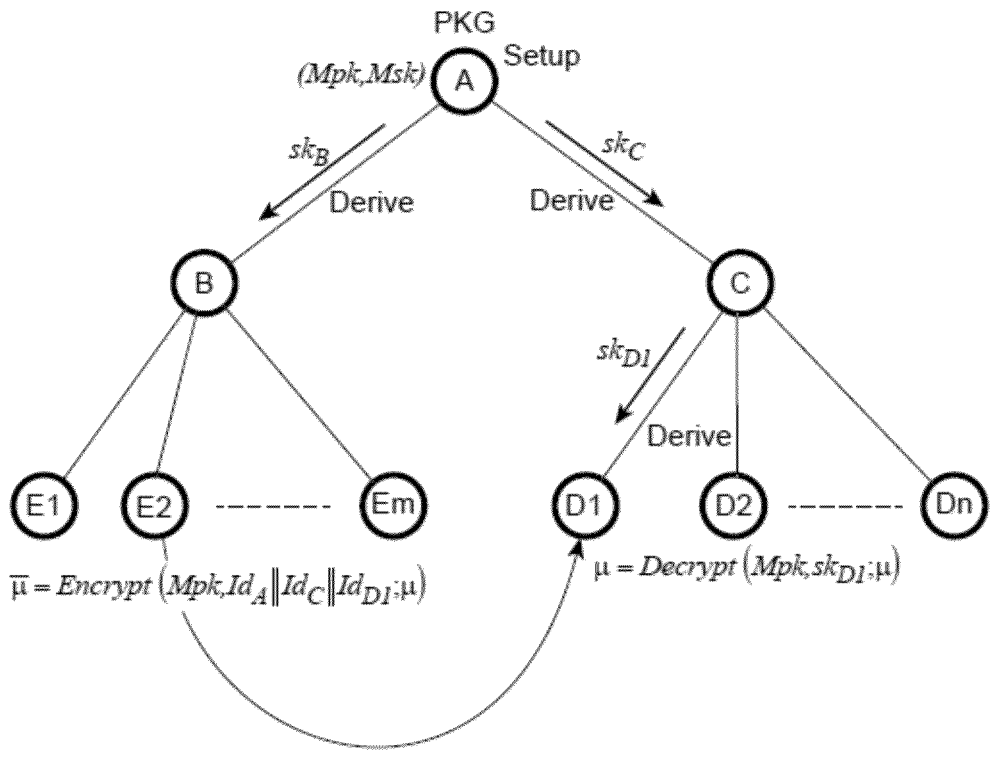
FIG. 1 shows an identity-based hierarchical asymmetric encryption scheme or HIBE known from the prior art.
Figure 2:
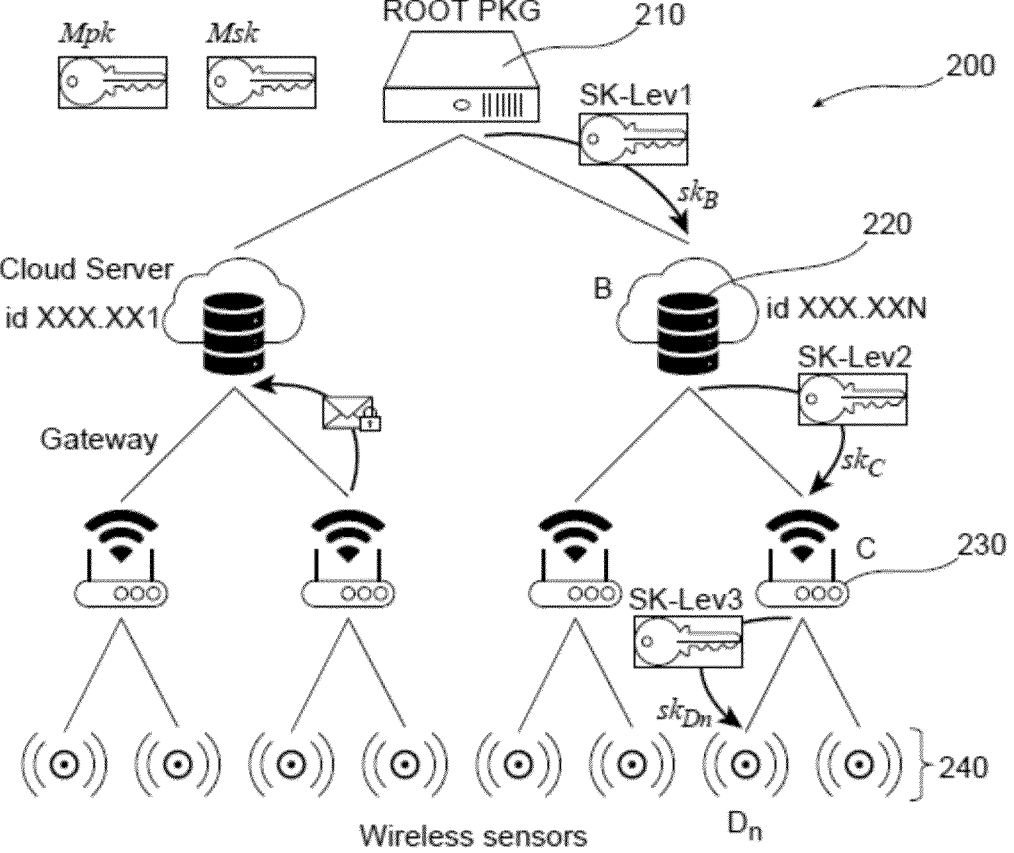
FIG. 2 shows schematically a case of use in which a hybrid hierarchical encryption system according to the invention can be deployed.

We consider hereinafter a network comprising a first subset of nodes and a second subset of nodes, separate from the first subset, the nodes of the second subset having constrained computing resources compared with the nodes of the first subset. We shall adopt, without loss of generality, a case of use of the present invention, namely an IoT network, as illustrated in FIG. 2.

The connected objects, 240, for example sensors, can establish wireless connections with gateways, 230, connected to the backhaul network. Remote servers (cloud servers) or ones at the network periphery (edge servers), 220, can store and make calculations on the data from the sensors that are transmitted to them. Finally, a PKG generator, 210, which can take the form for example of an HSM (Hardware Security Module) in a remote server (not shown), fulfils the role of root authority in a key-management infrastructure.

In the IoT network, 200, the connected objects (for example wireless sensors) form a second subset of nodes with constrained resources compared with the nodes of the first subset of nodes (remote or edge servers).

As indicated in the introductory part, deploying a post-quantum RHIBE infrastructure, such as the one based on the RHIBE WZH+ scheme, cannot be envisaged because of the weak computing resources of the connected objects.

A first idea at the basis of the present invention is providing a key-management infrastructure based on a hybrid cryptographic scheme, comprising a first (R)HIBE scheme deployed on the first subset of nodes and a second (R)HIBE scheme deployed on the second subset of nodes of the network, the two schemes being linked by a connection cryptographic primitive as described below.

The first (and respectively second) cryptographic scheme is adapted to the computing resources of the first (and respectively second) subset and provides the required security level therein.

The connection primitive between the two cryptographic schemes makes it possible both to isolate the two subsets of nodes from each other, in terms of security, and to make the second subset hierarchically dependent on the first. Isolation means that an attack made on the security of one subset cannot compromise the security of the other. Hierarchical dependency means that the keys of the nodes of the second subset can be revoked or updated without modification to the keys of the first subset but that the reverse is untrue. Furthermore, calculating the keys of the second subset depends on at least some of the keys of the first subset.

Figure 3:
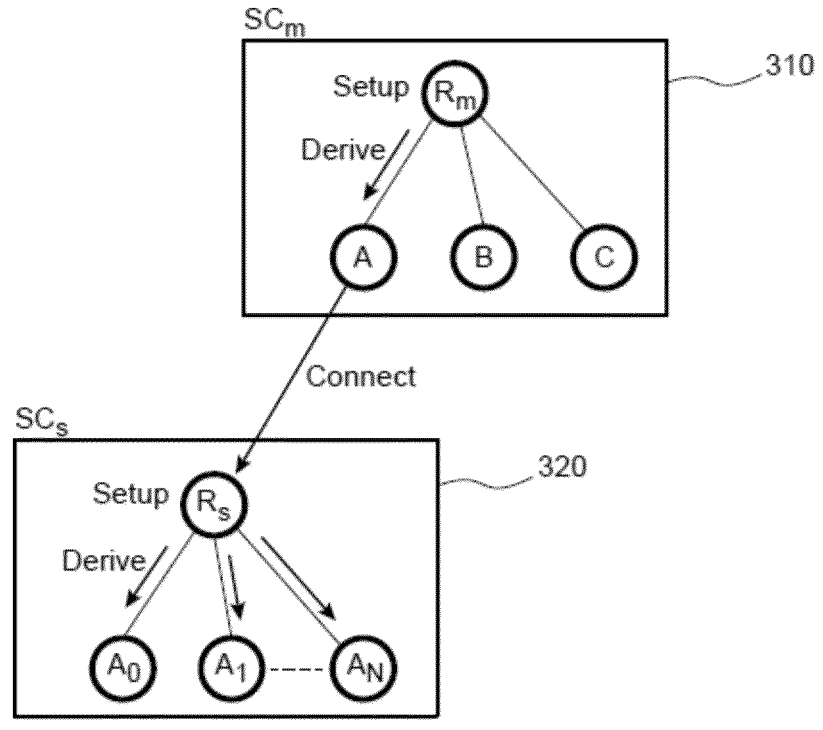
FIG. 3 shows a mechanism for generating keys in a hybrid hierarchical encryption system according to a first embodiment of the invention.

FIG. 3 shows a hybrid hierarchical encryption scheme according to a first embodiment of the invention.

The first subset of nodes, shown at 310, has a first (R)HIBE tree cryptographic architecture. It comprises in particular a first PKG generator (which may contain an HSM module) at its root, referred to as master generator, $R_m$, and ends at end nodes (leaves), denoted here A, B, C. The second subset of nodes, shown at 320, has a second (R)HIBE tree architecture, in the case illustrated an IBE architecture, comprising, at its root $R_s$, a second PKG generator (which may contain an HSM module), referred to as slave generator, and end nodes, denoted here $A_0, A_1, \ldots, A_N$. The (R)HIBE scheme, $SC_m$, of the first cryptographic architecture is defined by the following primitives:

[Math.1]

$$\mathrm{Setup}(1^{\lambda_m}, d_m) \rightarrow Msk_m \cdot Mpk_m \tag{1-1}$$

[Math.2]

$$\mathrm{Derive}(Mpk_m, Id_{path(v)}, sk_{parent(v)}) \rightarrow sk_v \tag{1-2}$$

[Math.3]

$$\mathrm{Encrypt}(Mpk_m, Id_{path(v)}) \rightarrow \bar{\mu} \tag{1-3}$$

[Math.4]

$$\mathrm{Decrypt}(Mpk_m, sk_v; \bar{\mu}) \rightarrow \mu \tag{1-4}$$

where $\lambda_m$ and $d_m$ are respectively the security level of the scheme $SC_m$ and the depth of its tree; $Msk_m$, $Mpk_m$ the private and public master keys of this scheme; $Id_{path(v)}$ the list of the identifiers of the nodes on the path of the tree between the root and the node v; sky and $sk_{parent(v)}$ respectively the private key of the node v and of its parent node in the tree; $Id_{path(v)}$ is the list of the identifiers of the nodes on the path of the tree between the root and the node v', that is the destination of the message u;

The (R)HIBE scheme, $SC_s$, of the second cryptographic architecture is for its part defined by the following primitives:

[Math.5]

$$\mathrm{Setup}(1^{\lambda_m}, d_s, \mathrm{seed}_s) \rightarrow Msk_s, Mpk_s \tag{2-1}$$

[Math.6]

$$\mathrm{Derive}(Mpk_s, Id_{path(v)}, sk_{parent(v)}) \rightarrow sk_v \tag{2-2}$$

[Math.7]

$$\mathrm{Encrypt}(Mpk_s, Id_{path(v)}; \mu) \rightarrow \bar{\mu} \tag{2-3}$$

[Math.8]

$$\mathrm{Decrypt}(Mpk_v, sk_v; \bar{\mu}) \rightarrow \mu \tag{2-4}$$

where $\lambda_s$ and $d_s$ are respectively the security level of the scheme $SC_s$ and the depth of its tree; $Msk_s$, $Mpk_s$ are the private and public master keys of this scheme and $\mathrm{seed}_s$ is a seed used by the cryptographic primitive Setup to generate this pair of master keys.

The seed $\mathrm{seed}_s$ is supplied by the connection primitive making it possible to link the scheme $SC_s$ to the scheme $SC_m$, this primitive being defined by:

[Math.9]

$$\mathrm{Connect}(sk_{leaf}, \mathrm{param}) \rightarrow \mathrm{seed}, \tag{3}$$

where $sk_{leaf}$ is the private key of an end node of the tree of the scheme $SC_m$ and param is an optional parameter. In the example illustrated in FIG. 3, the end node in question is the node A.

The primitive Connect is a one-way function, for example a cryptographic hash function, such as the SHA3 function, so as to isolate the security of the first subset from the security of the second subset. The optional parameter param can be the output of a counter incremented at each new update (in other words a version number), so as to avoid replay attacks. Where applicable, the public key $Mpk_m$ can also form part of the arguments of the primitive Connect.

The security level of the primitive Connect is advantageously selected higher than or equal to the security level, $\lambda_s$, of the cryptographic primitive Setup of the scheme $SC_s$.

The primitive Setup of the scheme $SC_s$ can use the seed $seed_s$ to generate a pseudorandom number, for example by means of a PRNG generator, so as to form all or part of the private master key, $Msk_s$.

In the particular case of an IoT network, the first scheme $SC_m$ can be a post-quantum RHIBE scheme such as, for example, RHIBE WZH+, and the second scheme can be an IBE scheme such as DLP, presented in the introductory part.

Figure 4:
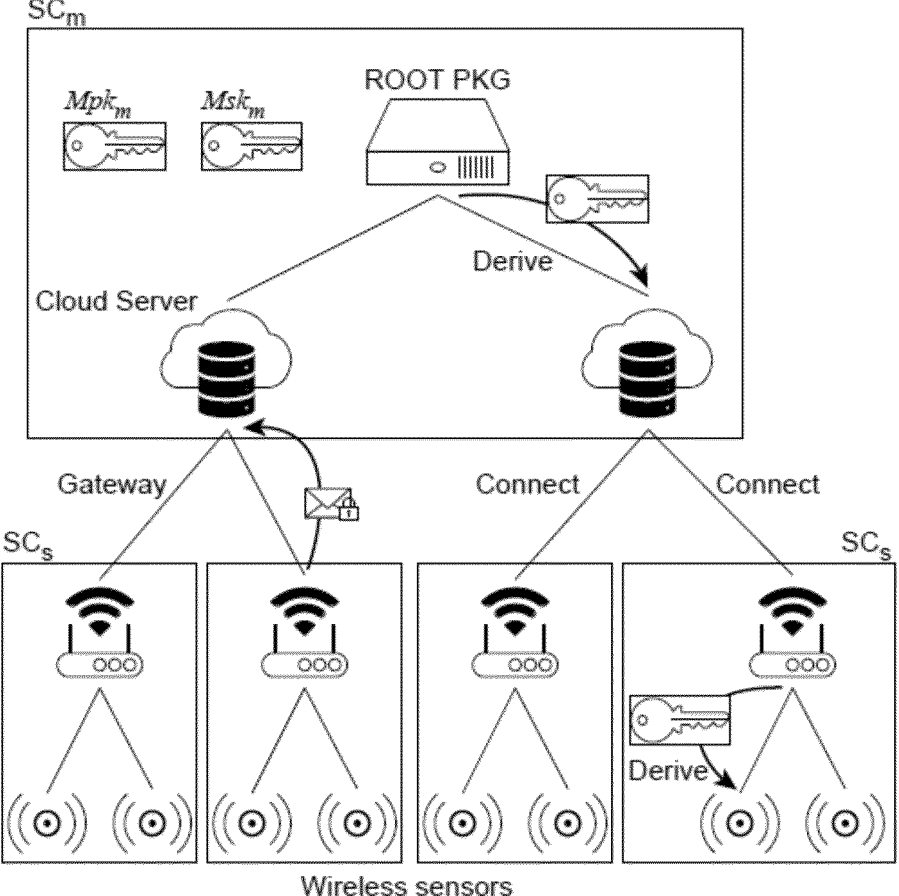
FIG. 4 shows an application of the hybrid hierarchical encryption of FIG. 3 to an IoT network.

FIG. 4 illustrates this particular case, the first subset comprising the root node hosting an HSM module, the computing servers (remote or edge servers) and the gateways (access points or base stations for example), and the second subset consisting of the connected objects.

The hybrid hierarchical encryption scheme presented above is based on the identity of the nodes (expressed in the form of a concatenation of identifiers), IBE. In a similar manner, a hybrid hierarchical encryption can be provided based on attributes of these nodes, (R)HABE, the attribute of a node being defined by the path in the tree described between the root and the node in question. More precisely, the attribute of an end node v can take the form $Att_{path(v)}$ $=Att_A \| \ldots \| Att_v$ where $Att_A, \ldots, Att_v$ are attribute values of rank $1, \ldots, \lambda$, A being the root and $\lambda$ being the depth of the tree. By way of illustration, an attribute of first rank can be a company, the attribute of a second rank can be a department of this company, the attribute of a third rank can be a service within this department, etc.

The (R)HABE scheme, $SC_m$, of the first cryptographic architecture is defined by the following primitives:

[Math.10]

$$Setup(1^{\lambda_m}, d_m) \rightarrow Msk_m, Mpk_m \qquad (4\text{-}1)$$

[Math.11]

$$Derive(Mpk_m, Att_{path(v)}, sk_{path(v)}) \rightarrow sk_v \qquad (4\text{-}2)$$

[Math.12]

$$Encrypt(Mpk_m, Att_{path(v)}; \mu) \rightarrow \bar{\mu} \qquad (4\text{-}3)$$

[Math.13]

$$Decrypt(Mpk_s, sk_v; \bar{\mu}) \rightarrow \mu \qquad (4\text{-}4)$$

with the same notation conventions as before. In a similar manner, the (R)HABE scheme, $SC_s$, of the second cryptographic architecture is defined by the following primitives:

[Math.14]

$$Setup(1^{\lambda_m}, d_s, seed_s) \rightarrow Msk_s, Mpk_s \qquad (5\text{-}1)$$

[Math.15]

$$Derive(Mpk_s, Att_{path(v)}, sk_{parent(v)}) \rightarrow sk_v \qquad (5\text{-}2)$$

[Math.16]

$$Encrypt(Mpk_s, Att_{path(v)}; \mu) \rightarrow \bar{\mu} \qquad (5\text{-}3)$$

[Math.17]

$$Decrypt(Mpk_s, sk_v; \bar{\mu}) \rightarrow \mu \qquad (5\text{-}4)$$

with the same notation conventions as before. The seed $seed_s$ is obtained by means of a connection primitive making it possible to link the scheme $SC_s$ to the scheme $SC_m$, this primitive being defined by:

[Math.18]

$$Connect(sk_{leaf}, param) \rightarrow seed_s \qquad (6)$$

where $sk_{leaf}$ is the private key of an end node of the tree of the scheme $SC_m$ and param is an optional parameter. The various variant embodiments described for the (R)HABE scheme also apply here. In particular, the connection primitive can be based on a one-way function and param can be the output of a counter to avoid replay attacks.

In other embodiments, the first scheme $SC_m$ can be of the (R)HIBE type and the second scheme $SC_s$ can be of the (R)HABE type, or vice versa. In all cases, the schemes selected will be adapted to the respective computing resources of the first and second subsets.

Figure 5:
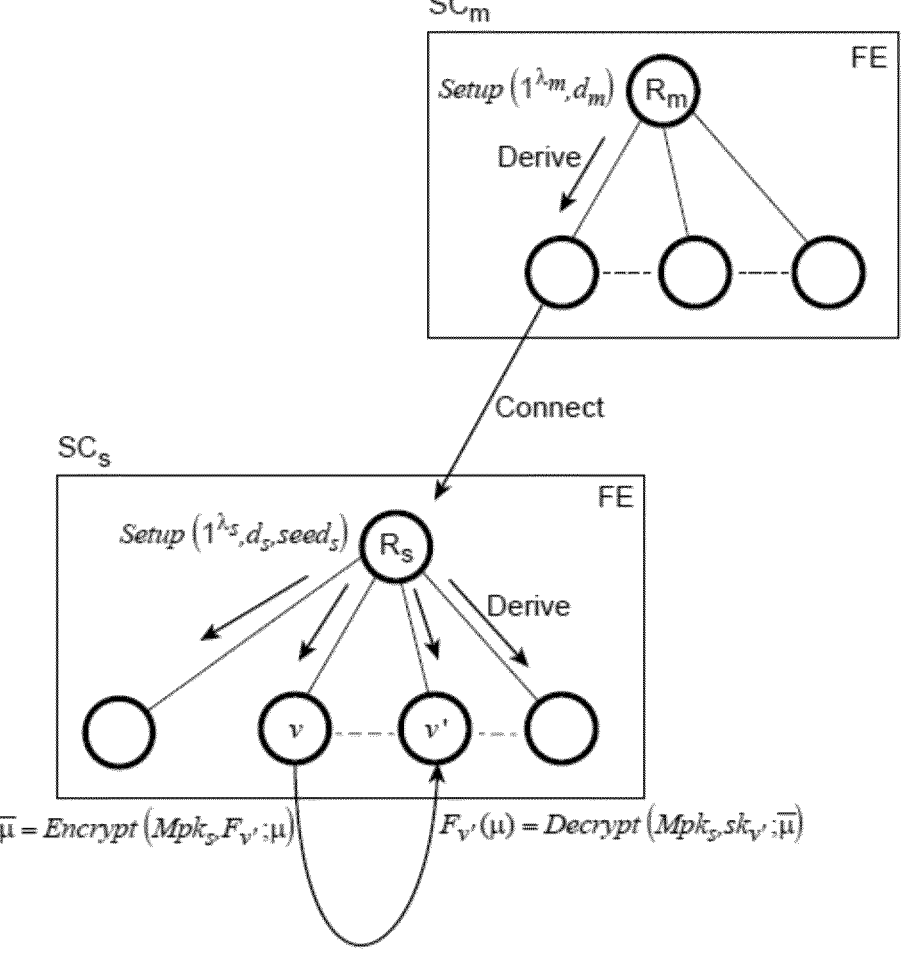
FIG. 5 shows a mechanism for generating keys in a hybrid hierarchical encryption system according to a second embodiment of the invention.

More generally, the hybrid hierarchical encryption scheme according to the present invention can be based on functions, each node then having a secret (or private) key enabling it to evaluate a function associated with this key. Such a scheme, known by the term functional encryption (FE), can be considered to be a generalisation of identity-based encryption and attribute-based encryption. It can be in the form of a hybrid hierarchical version (with possible revocation of keys associated with these functions) within the meaning of the present invention, and hence the acronym (R)HFE, as shown in FIG. 5.

The (R)HFE scheme, $SC_m$, of the first cryptographic architecture is defined by the following primitives:

[Math.19]

$$Setup(1^{\lambda_m}, d_m) \rightarrow Msk_m, Mpk_m \qquad (7\text{-}1)$$

[Math.20]

$$Derive(Mpk_m, F_v, sk_{parent(v)}) \rightarrow sk_v \qquad (7\text{-}2)$$

[Math.21]

$$Encrypt(Mpk_m, F_v; \mu) \rightarrow \bar{\mu} \qquad (7\text{-}3)$$

[Math.22]

$$Decrypt(Mpk_m, Sk_v; \bar{\mu}) \rightarrow F_v(\mu) \qquad (7\text{-}4)$$

where $F_v$ is the function associated with the node v, in other words the function that this node can evaluate by means of knowledge of its private key, $sk_v$. In a similar manner, the (R)HFE scheme, $SC_s$, of the second cryptographic architecture is defined by the following primitives:

[Math.23]

$$Setup(1^{\lambda_m}, d_s, seed_s) \rightarrow Msk_s, Mpk_s \qquad (8\text{-}1)$$

[Math.24]

$$Derive(Mpk_s, F_v, sk_{parent(v)}) \rightarrow sk_v \qquad (8\text{-}2)$$

[Math.25]

$$Encrypt(Mpk_s, F_v; \mu) \rightarrow \bar{\mu} \qquad (8\text{-}3)$$

[Math.26]

$$Decrypt(Mpk_s, sk_v; \bar{\mu}) \rightarrow F_v(\mu) \qquad (8\text{-}4)$$

The seed $seed_s$ is obtained by means of a connection primitive making it possible to link the scheme $SC_s$ to the scheme $SC_m$, this primitive being defined by:

[Math.27]

$$Connect(Sk_{leaf}, param) \rightarrow seed_s \qquad (9)$$

where $sk_{leaf}$ is the private key, corresponding to the function $F_{leaf}$ of an end node of the tree of the scheme $SC_m$ and param is an optional parameter. The various variant embodiments described previously also apply and will not be repeated here.

Figure 6:
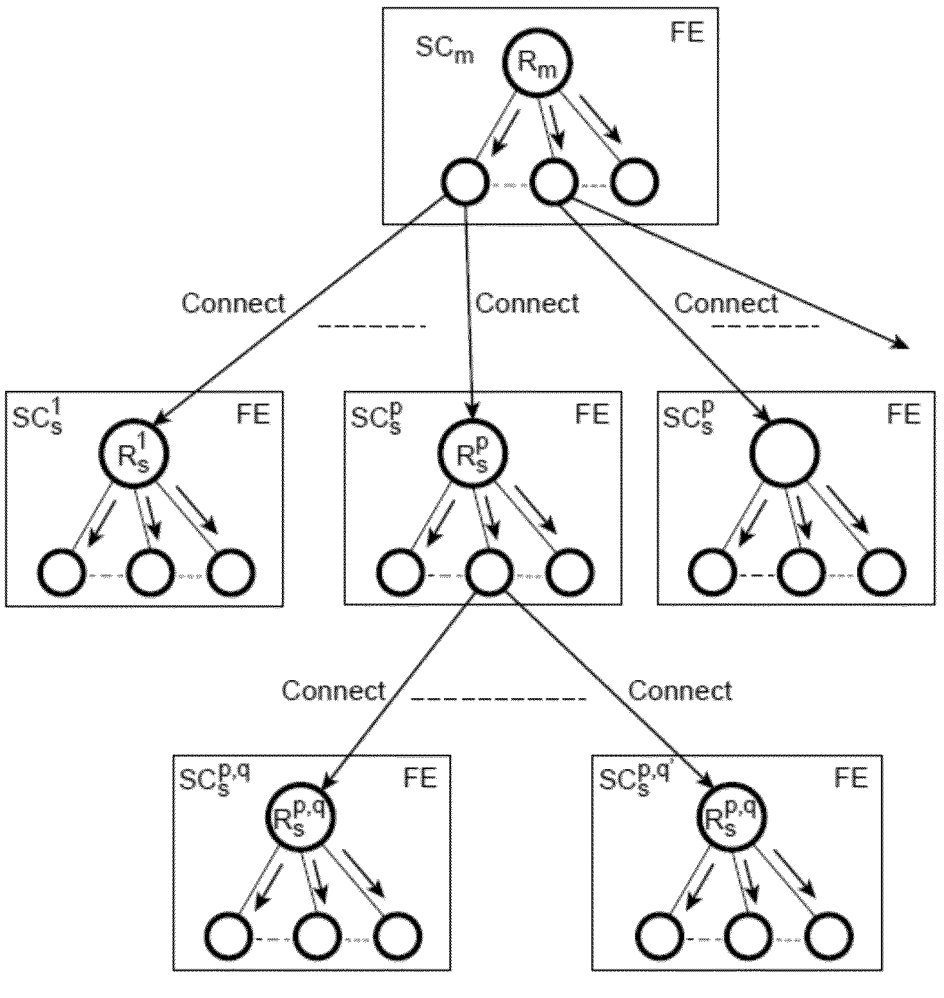
FIG. 6 shows a mechanism for generating keys in a hybrid hierarchical encryption system according to a general embodiment of the invention.

Finally, the hybrid hierarchical encryption shown in FIG. 3 or in FIG. 5 comprises only a master scheme $SC_m$ for a first subset of nodes and a slave scheme $SC_s$ for a second subset of nodes. In general terms, this hierarchical dependency can be iterated in depth and in width to construct a more complex tree scheme. Thus FIG. 6 shows such an example of hybrid tree encryption.

The network is then divided into a plurality of subsets of separate nodes, a master cryptographic scheme $SC_m$ being deployed on a first subset and cryptographic schemes, here denoted $$SC_s^{p,q}$$

being deployed on subsets of lower ranks. The cryptographic schemes are of complexity adapted to the computing resources of the subsets of nodes on which they are deployed.

The cryptographic schemes $SC_m$ and $$SC_s^{p,q}$$

can be of the (R)(H)FE type, as described above. Each cryptographic scheme of lower rank $$SC_s^{p,q}$$

is linked to a cryptographic scheme of higher rank $$SC_s^{p},$$

and each cryptographic scheme of higher rank is linked to the cryptographic scheme $SC_m$, the links between the various schemes being provided by primitives Connect as described above.

What is claimed is:

1. Hierarchical cryptographic system comprising a network of hardware nodes divided into at least a first subset and a second subset of separate nodes, the computing resources of the nodes of the first subset being greater than the computing resources of the nodes of the second subset, wherein a first functional cryptographic scheme is deployed on the first subset of nodes and wherein a second functional cryptographic scheme is deployed on the second subset of nodes, the second functional cryptographic scheme including a first cryptographic primitive intended to generate a pair of private and public master keys, $Msk_s$, $Mpk_s$, for generating, each time from a node to a another node, by means of a second cryptographic primitive a private key for each of the nodes of the second subset, said first cryptographic primitive generating the pair of private and public master keys from a seed, said seed being obtained by a connection cryptographic primitive, from at least the private key of an end node of the first subset, said connection cryptographic primitive being a one-way function.

2. Hierarchical cryptographic system according to claim 1, wherein a security level of the connection cryptographic primitive is higher than or equal to the security level of the first cryptographic primitive.

3. Hierarchical cryptographic system according to claim 1, wherein the connection cryptographic primitive comprises as argument an output of a counter, incremented each time the private and public master keys are updated, $Msk_s$, $Mpk_s$.

4. Hierarchical cryptographic system according to claim 3, wherein the one-way function is a hash function.

5. Hierarchical cryptographic system according to claim 1, wherein the first cryptographic primitive uses said seed to generate a pseudorandom number.

6. Hierarchical cryptographic system according to claim 1, wherein the first functional cryptographic scheme and/or the second functional cryptographic scheme is a hierarchical encryption scheme based on a identity of the hardware nodes, the identity of a given node being defined as a concatenation of a plurality of identifiers of the hardware nodes through which a path passes going from a tree root of said hierarchical encryption scheme to the given node.

7. Hierarchical cryptographic system according to claim 1, wherein the first functional cryptographic scheme and/or the second functional cryptographic scheme is a hierarchical encryption scheme based on an attribute of the hardware nodes, an attribute of a given node being defined as a concatenation of the attributes of ranks of the hardware nodes through which a path passes going from a tree root of said hierarchical encryption scheme to the given node.

8. Hierarchical cryptographic system according to claim 1, wherein the first cryptographic scheme is an identity-based hierarchical encryption scheme with revocation of keys and wherein the second scheme is a simple identity-based encryption scheme.

9. Hierarchical cryptographic system according to claim 1, wherein the first cryptographic scheme is an encryption scheme of a post-quantum type whereas the second cryptographic scheme is not.

10. Hierarchical cryptographic system according to claim 8, wherein the first and second cryptographic schemes are first and second encryption schemes of a post-quantum type, the first post-quantum encryption scheme being the Revocable Hierarchical Identity Based Encryption from Wang, Zhang, He, Wang, and Li (RHIBE WZH+) scheme and the second post-quantum encryption scheme being a Ducas, Lyubashevsky, and Prest (DLP) scheme.

11. Hierarchical cryptographic system according to claim 1, wherein the network of nodes is an IoT network, the first subset comprising remote servers and the second subset comprising connected objects.

* * * * *